(12) United States Patent
Han et al.

(10) Patent No.: US 10,082,138 B2
(45) Date of Patent: Sep. 25, 2018

(54) VALVE AND VALVE SEAT FOR A DIAPHRAGM PUMP

(71) Applicant: Flowserve Management Company, Irving, TX (US)

(72) Inventors: Yang Han, Bethlehem, PA (US); Sidney Lowe, Moyock, NC (US)

(73) Assignee: Flowserve Management Company, Irvine, TX (US)

( * ) Notice: Subject to any disclaimer, the term of this patent is extended or adjusted under 35 U.S.C. 154(b) by 492 days.

(21) Appl. No.: 14/467,207

(22) Filed: Aug. 25, 2014

(65) Prior Publication Data

US 2016/0053756 A1    Feb. 25, 2016

(51) Int. Cl.
*F04B 53/10* (2006.01)
*F16K 15/14* (2006.01)

(52) U.S. Cl.
CPC ........ *F04B 53/106* (2013.01); *F04B 53/1065* (2013.01); *F16K 15/148* (2013.01)

(58) Field of Classification Search
CPC ........ F16K 15/148; F04B 45/04; F04B 43/02; F04B 53/1065; F04B 53/1047; F04B 53/106
See application file for complete search history.

(56) References Cited

U.S. PATENT DOCUMENTS 4,610,605 A * 9/1986 Hartley ............... F04B 43/0054
417/269
4,762,149 A * 8/1988 Pickl, Jr. ............... F16K 15/148
137/843

5,632,607 A    5/1997 Popescu et al.
6,048,183 A    4/2000 Meza
6,299,414 B1  10/2001 Schoenmeyr
(Continued)

FOREIGN PATENT DOCUMENTS

JP    H08326938 A    12/1996
JP    H11153239 A    6/1999
(Continued)

OTHER PUBLICATIONS

International Preliminary Report on Patentability for Appl No. PCT/US2015/046551 dated Nov. 27, 2015.
(Continued)

*Primary Examiner* — Bryan Lettman
(74) *Attorney, Agent, or Firm* — Maine Cernota & Rardin (57) ABSTRACT

A valve assembly for a diaphragm pump reduces leakage while providing good flow-through by including shaping of the seat and/or the valve that increases the elastic tension between the valve and seat in outer regions of the valve assembly, thereby providing a more optimal tension over the entire valve. In embodiments, outer regions of the seat are more steeply sloped upward than inner regions while the valve is substantially uniform in slope. In other embodiments, valve outer regions are less steeply sloped upward, or more steeply sloped downward, than its inner regions, and the seat is substantially uniform in slope. A vertical cross section of the seat and/or valve can include continuous curvature and/or discrete changes in linear slope. In some embodiments, two linear slopes are included in the vertical cross section of the seat or valve. The pump can be a multi-chamber pump.

10 Claims, 9 Drawing Sheets

(56) References Cited

U.S. PATENT DOCUMENTS

| | | | | |
|---|---|---|---|---|
| 6,648,004 B2* | 11/2003 | Lau | ...................... | F16K 15/148 |
| | | | | 137/223 |
| 7,762,791 B2 | 7/2010 | Cae et al. | | |
| 7,988,266 B2 | 8/2011 | Xiao et al. | | |
| 8,276,617 B2 | 10/2012 | Cai et al. | | |
| 2005/0126649 A1* | 6/2005 | Onishi | .................. | F04B 43/046 |
| | | | | 137/854 |

FOREIGN PATENT DOCUMENTS

| | | | |
|---|---|---|---|
| JP | 2008303951 A | 12/2008 | |
| JP | 2009250363 A | 10/2009 | |

OTHER PUBLICATIONS

International Search Report for Appl No. PCT/US2015/046551 dated Nov. 30, 2015.
Written Opinion of the International Search Report for Appl No. PCT/US2015/046551 dated Nov. 27, 2015.

* cited by examiner

VALVE AND VALVE SEAT FOR A DIAPHRAGM PUMP

FIELD OF THE INVENTION

The invention relates to diaphragm pumps, and more particularly to inlet and outlet valves for diaphragm pumps.

BACKGROUND OF THE INVENTION

Diaphragm pumps are used in many pumping applications, and offer several distinct advantages as compared to rotary and other types of pumps. Diaphragm pumps have good suction lift characteristics, good dry running characteristics, and can be up to 97% efficient. Various types of diaphragm pump work well with air and with highly viscous liquids, and can have good self-priming capabilities. Depending on the design, diaphragm pumps can also minimize the number of moving parts that are in contact with the process fluid. This can be ideal for applications to gritty and/or highly viscous liquids, and to corrosive liquids and gases.

Figure 1:
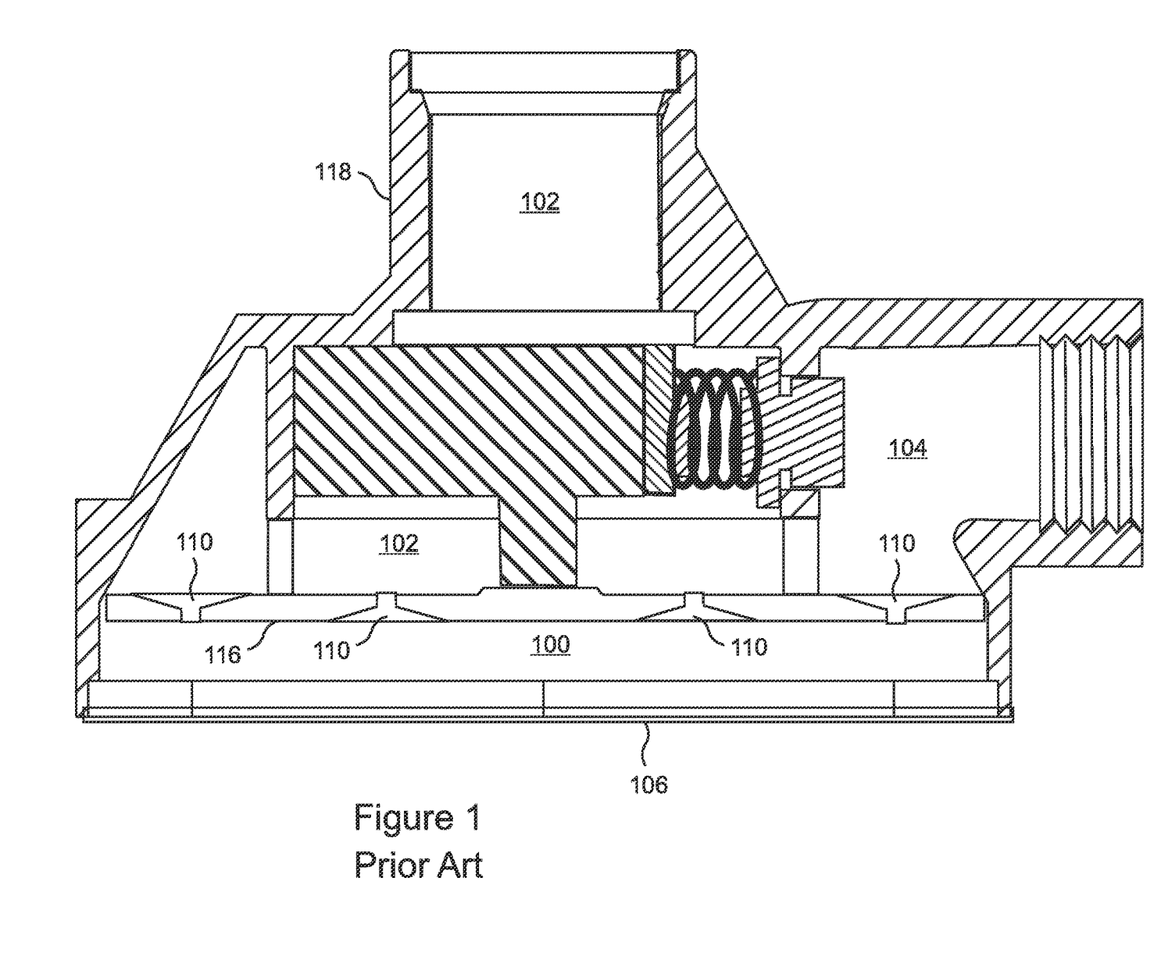
FIG. 1 is a sectional illustration of a diaphragm pump of the prior art.

FIG. 1 is a cross-sectional illustration of a diaphragm pump of the prior art. It is described in more detail in co-pending application Ser. No. 14/332,627, which is incorporated herein by reference in its entirety for all purposes. The pump includes a pump housing 118 that surrounds a pumping chamber 100 having a fluid inlet 102 and a fluid outlet 104. The pumping chamber 100 is bounded on one side by a flexible diaphragm 106, which can be distorted so as to increase and/or decrease the volume of the pumping chamber 100. One or more inlet and outlet valve assemblies 110 control the flow of process fluid, so that when the volume of the pumping chamber 100 is increased, process fluid is drawn into the pumping chamber 100 through the fluid inlet 102 and through the inlet valve assemblies 110, and when the volume of the pumping chamber 100 is decreased, process fluid flows out of the pumping chamber 100 through the outlet valve assemblies 110 and into the outlet.

In theory, there should be no leakage past the inlet and outlet valve assemblies 110 when they are closed. However, in practice some leakage can occur. Leakage can be especially problematic when pumping a compressible gas, for example because the fluid to be pumped is a gas, or during self-priming as a liquid is first drawn into the unprimed pump. Of course, any such valve leakage will significantly reduce the efficiency of the pump.

Figures 2A, 2B:
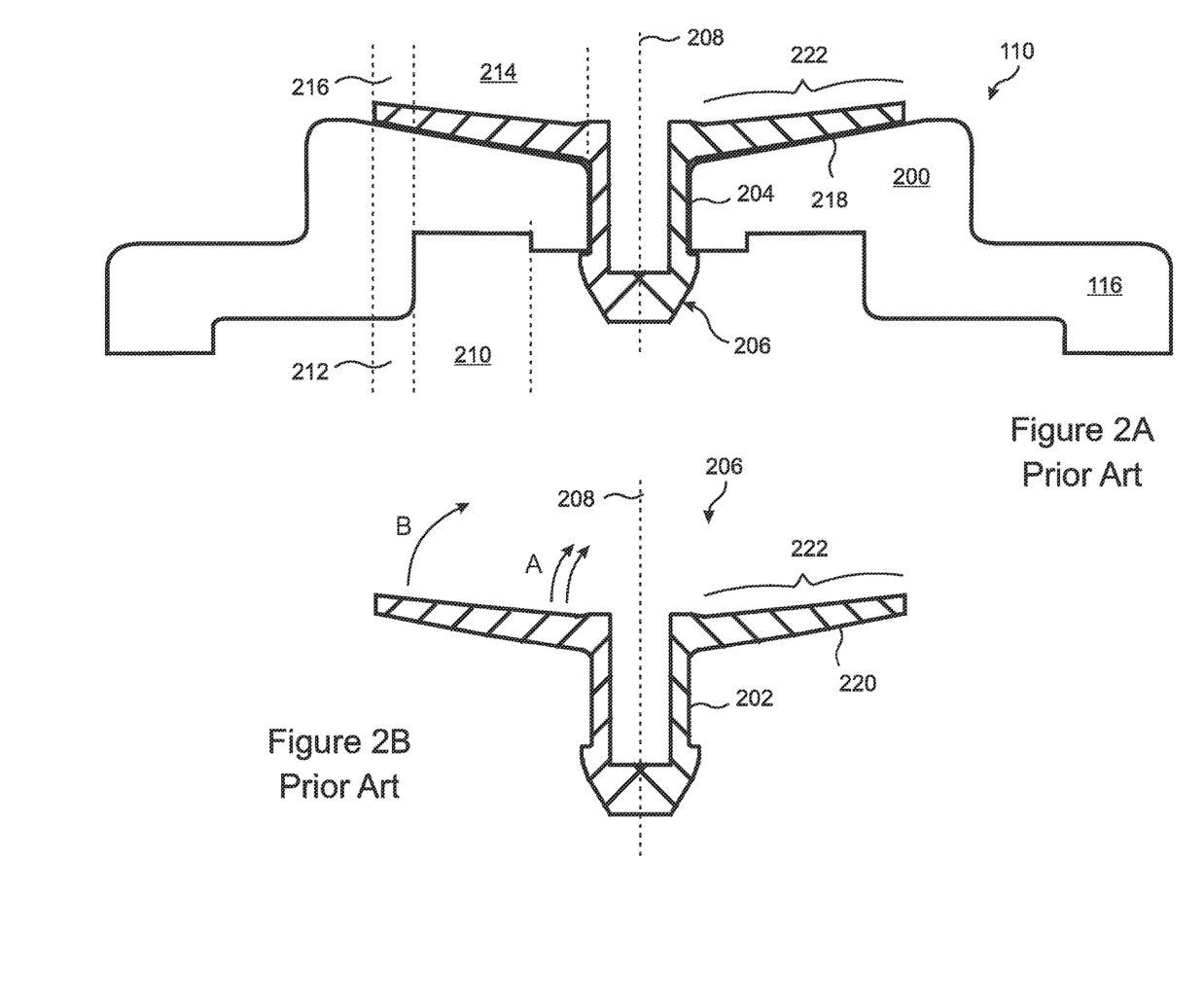
FIG. 2A is a cross-sectional illustration of a valve and valve seat of the prior art.
FIG. 2B is a cross-sectional illustration of the valve of FIG. 2A.

With reference to FIGS. 2A and 2B, in many diaphragm pumps, including the example illustrated in FIG. 1, each of the inlet and outlet valve assemblies 110 includes a seat 200 having a central shank 204 into which a stem 200 of a valve 206 manufactured from an elastomer is inserted. The seat also includes a sealing surface 218 against which a valve sealing surface 220 of a flexible extension 222 of the valve 206 is pressed when the valve 206 is installed in the seat 200. Both the valve 206 and the valve seat 200 are typically symmetric about a central, vertical axis 208. The seat 200 may be formed in a valve plate 116, and the sealing surface 218 of the seat 200 will typically include an inner region 210 in which an inner part 214 of the flexible extension 222 of the valve 206 is supported by a plurality of spaced-apart support beams (see FIG. 6) that allow fluid to pass through the valve plate 116 when the valve assembly 110 is open. The sealing surface 218 of the seat 200 will typically further include an outer sealing region 212 that forms a fluid seal with a corresponding outer region 216 of the valve sealing surface 220 when the valve assembly 110 is closed.

The stem 202 of the valve 206 will typically be slightly shorter than the shank 204, so that the valve sealing surface 220 will be pressed against the sealing surface 218 of the seat 200 when the valve assembly 110 is closed. Often, the valve 206 will be shaped such that at least some portion of the valve flexible extension 222 will be deflected upward by the sealing surface 218 of the seat 200 when the valve stem 202 is installed in the shank 204.

The tension between the outer region 216 of the valve sealing surface 220 and the sealing region 212 of the valve sealing surface 220 when the valve assembly 110 is closed will depend, among other factors, on the relative lengths of the stem 202 and shank 204, the elasticity of the valve flexible extension 222, and the relative shapes of the valve flexible extension 222 and the sealing surface 218 of the valve seat 200. This tension must be adjusted to a value that is essentially a compromise. Too much tension in the inner region 210 will inhibit the valve from fully opening. Too little tension in the outer region 212 will increase the likelihood that the valve assembly 110 will leak when nominally shut.

Adjusting the valve tension is made even more problematic due to a "leverage" effect, as illustrated in FIG. 2B. For any given force applied by the stem 202 and shank 204 to the valve flexible extension 222, relatively more force will be applied near the center 208 of the valve 206, indicated by letter "A" in the figure, while relatively less force will be applied further from the center 208, e.g. near the rim as illustrated by letter "B" in the figure, due to the flexibility of the valve flexible extension 222 and the greater leverage distance between the outer region 216 and the center 208. Accordingly, it can be difficult to find a compromise solution that will allow adequate flow through the valve assembly 110 when it is open, but will also minimize leakage when it is shut.

One approach is to rely on the pressure applied by a process fluid to the outer region 216 of the valve flexible extension 222 to minimize leakage. However, process fluid pressure cannot always be relied upon to hold the valve 110 shut, especially when a compressible gas is being pumped through the valve 110.

What is needed, therefore, is a valve assembly that reduces leakage when closed while providing good flow-through when open.

SUMMARY OF THE INVENTION

An improved valve assembly for a diaphragm pump reduces leakage when closed while providing good flow-through when open. The valve assembly includes shaping of the seat and/or the valve flexible extension that increases the tension between the valve flexible extension and the valve seat in outer regions of the valve assembly without increasing the tension in inner regions, thereby offsetting the "leverage" effect and providing a more optimal tension over the entire valve flexible extension.

In embodiments, outer regions of the seat are more steeply sloped upward than inner regions, while the valve flexible extension is substantially uniform in slope, so that corresponding outer regions of the valve flexible extension are vertically displaced more than inner portions when the valve is installed in the seat. If the vertical displacement is described as a function $D(r)$, where "r" is the distance from the center of the valve, then this means that the slope of $D(r)$ is greater in the outer portion(s) than in the inner portion(s).

In other embodiments, a similar result is realized by shaping the valve flexible extension so that its outer regions are less steeply sloped upward, or more steeply sloped downward, than its inner regions, while the sealing surface of the seat is substantially uniform in slope. In still other embodiments, neither the valve flexible extension nor the seat is uniform in slope.

The seat and/or the valve can be symmetrical about a vertical axis, and a vertical cross section of the seat sealing surface and/or valve flexible extension can include continuous curvature and/or discrete changes in linear slope. In some embodiments, two linear slopes are included in the vertical cross section of the seat and/or valve.

In various embodiments, the diaphragm pump is a multi-chamber pump, and in some of these embodiments the diaphragm pump includes six chambers, each of which includes an inlet valve assembly and an outlet valve assembly.

One general aspect of the present invention is a one-way valve assembly, which includes a valve seat having a first sealing surface, said first sealing surface having a first surface shape, and a valve having an attachment feature and a flexible extension, said flexible extension including a second sealing surface, said second sealing surface having a second surface shape when the valve is not attached to the valve seat and the flexible extension is in a relaxed state. A difference between said first surface shape and said second surface shape causes vertical elastic displacement of said flexible extension when said valve is attached to said valve seat by said attachment feature, said vertical elastic displacement tending to press the second sealing surface against the first sealing surface so as to form a fluid seal therebetween. The vertical elastic displacement can be described as a function $D(r)$, where r is a radial distance from a center of the valve seat, $D(r)$ having a slope that is greater at a larger value of r than it is at a smaller value of r.

In embodiments, said attachment mechanism includes a valve stem having a retention barb that is configured to retain the valve stem in a shank of the valve seat, said valve stem being shorter than said shank, thereby causing said second sealing surface to be pressed against said first sealing surface when the valve is installed in the valve seat.

In some embodiments, both the first and second surface shapes curve upward as a function of increasing radial distance r from the center of the valve seat, the second surface shape curving upward more rapidly than the first surface shape. In other embodiments, the first surface shape includes a flat annular outer region concentric about a flat annular inner region, a slope of the first surface shape being at least 10 degrees greater in the outer annular region that in the inner annular region.

In various embodiments at least one of the first surface shape and the second surface shape is a section of a first right circular conical surface bounded by two horizontal planes.

Another general aspect of the present invention is a diaphragm pump for pumping a process fluid, the diaphragm pump including a pump housing, an inlet region within the pump housing into which process fluid flows in an inlet direction, an outlet region within the pump housing from which process fluid flows out in an outlet direction, a pumping zone that is separated from the inlet region by at least one inlet valve assembly, and from the outlet region by at least one outlet valve assembly, the pumping zone being partially bounded by a flexible diaphragm, at least one of said inlet valve assembly and said outlet valve assembly including a valve seat having a first sealing surface, said first sealing surface having a first surface shape, and a valve having an attachment feature and a flexible extension, said flexible extension including a second sealing surface, said second sealing surface having a second surface shape when the valve is not attached to the valve seat and the flexible extension is in a relaxed state. A difference between said first surface shape and said second surface shape causes vertical elastic displacement of said flexible extension when said valve is attached to said valve seat by said attachment feature, said vertical elastic displacement tending to press the second sealing surface against the first sealing surface so as to form a fluid seal therebetween. The vertical elastic displacement can be described as a function $D(r)$, where r is a radial distance from a center of the valve seat, $D(r)$ having a slope that is greater at a larger value of r than it is at a smaller value of r.

In embodiments, said attachment mechanism includes a valve stem having a retention barb that is configured to retain the valve stem in a shank of the valve seat, said valve stem being shorter than said shank, thereby causing said second sealing surface to be pressed against said first sealing surface when the valve is installed in the valve seat.

In some embodiments, both the first and second surface shapes curve upward as a function of increasing radial distance r from the center of the valve seat, the second surface shape curving upward more rapidly than the first surface shape.

In other embodiments, the first surface shape includes a flat annular outer region concentric about a flat annular inner region, a slope of the first surface shape being at least 10 degrees greater in the outer annular region that in the inner annular region.

And in various of these embodiments, at least one of the first surface shape and the second surface shape is a section of a first right circular conical surface bounded by two horizontal planes.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

An improved valve assembly for a diaphragm pump reduces leakage when closed while providing good flow-through when open. The valve assembly includes shaping of the sealing surface of the valve seat and/or the sealing surface of the valve flexible extension that presses against the seat. The shaping increases the tension on the outer portions of the valve's sealing surface as compared to the inner portions by causing a greater degree of vertical deflection of the outer portions of the flexible extension when the valve is installed in the seat, thereby increasing the elastic pressure applied to the outer portions, offsetting the "leverage" effect, and providing a more optimal tension over the entire valve sealing surface.

Figure 3:
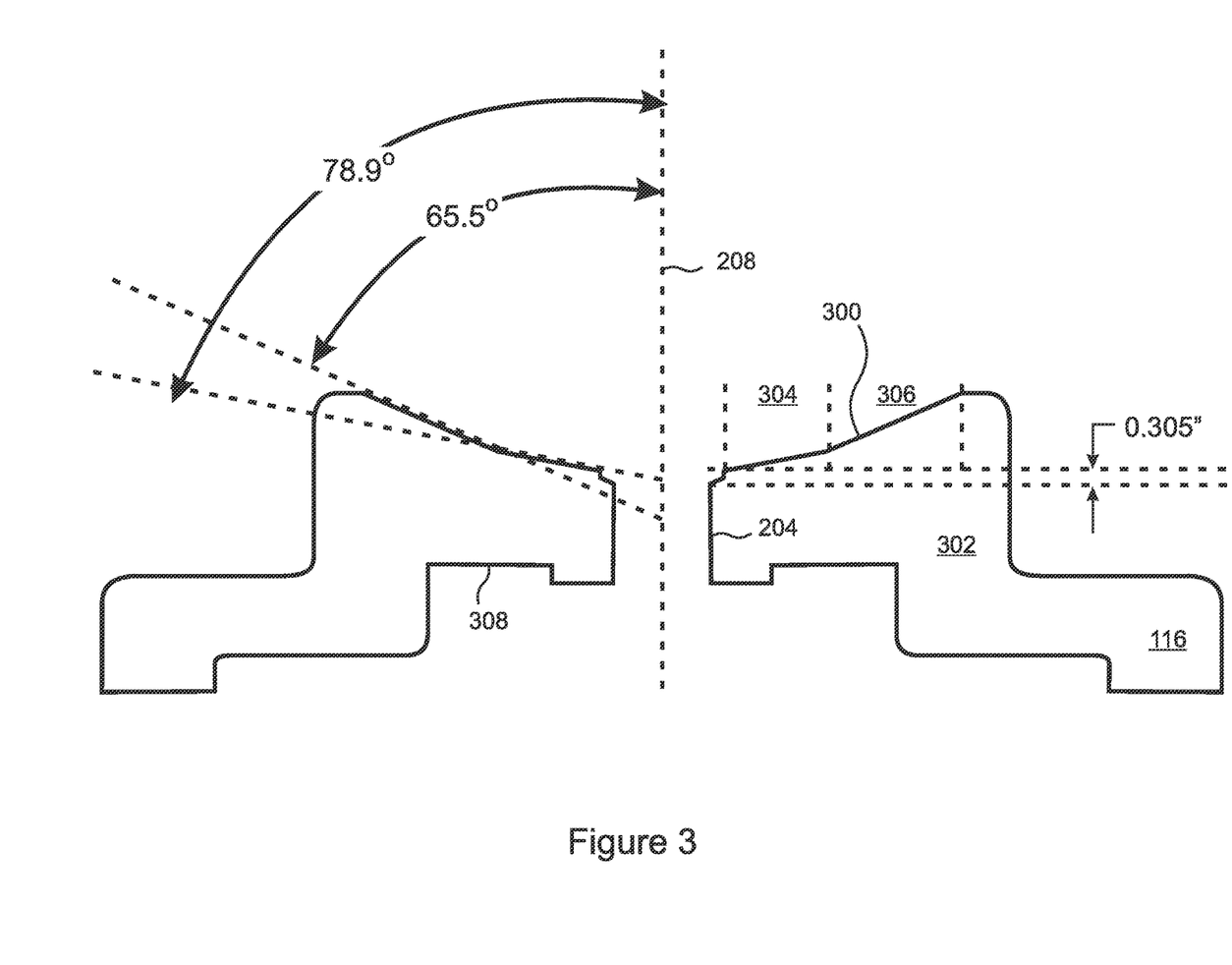
FIG. 3 is a cross-sectional illustration drawn to scale of a valve seat in an embodiment of the present invention.
Figure 4A:
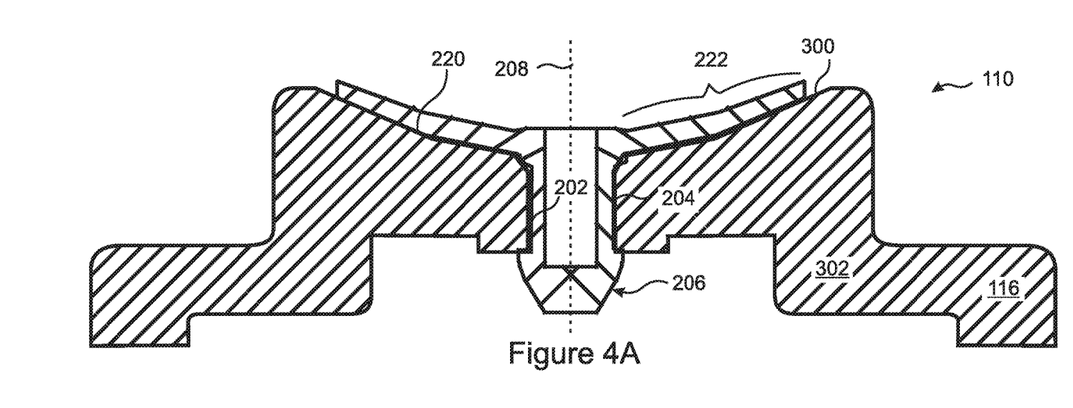
FIG. 4A is a cross-sectional view drawn to scale of the valve seat of FIG. 3 shown with a valve installed.

With reference to FIGS. 3 and 4A, in embodiments the valve assembly 110 is symmetric about a vertical axis 208, the valve seat 302 being formed in a valve plate 116. The shape in vertical cross section of the sealing surface 300 of the valve seat 302 and/or the sealing surface 220 of the valve flexible extension can include continuous curvature and/or discrete changes in linear slope. In the embodiment of FIGS. 3 and 4A, the cross sectional shape of the sealing surface 300 of the valve seat 302 includes two flat regions 304, 306, wherein the outer flat region 306 makes a smaller angle with the vertical axis 206 than the inner flat region 304, the outer flat region 306 thereby having a greater slope than the inner flat region 304. The cross-sectional shape of the valve sealing surface 220 in this embodiment is substantially a single flat region that slopes at a slightly greater angle from vertical (i.e. closer to the horizontal) than the inner region 304 of the seat sealing surface 300. As a result, the outer region of the valve flexible extension 222 that overlays the outer region 306 of the sealing surface 300 is vertically displaced more than the inner portion when the valve stem 202 is installed in the shank 204.

In embodiments, the vertical displacement, when expressed as a function D(r) of the radial distance r from the center of the valve assembly, differs in slope between the inner 304 and outer 306 regions by at least five degrees. In the specific embodiment of FIG. 3, the inner region of linear slope 304 of the seat sealing surface 300 makes an angle of 78.9° with the vertical 208, and the outer region of linear slope 306 makes an angle of 65.5° from the vertical 208. Note that the cross section presented in FIG. 3 is taken through a pair of opposing, vertical support bars 308 between which which fluid can flow when the valve assembly 110 is open.

In geometric terms, the two "flat" regions 304, 306 of the valve seat 200 in FIG. 3 are shaped in three dimensions as sections of right circular conical surfaces, where the apertures of the two right circular conical surfaces differ by more than 10 degrees.

Figure 4B:
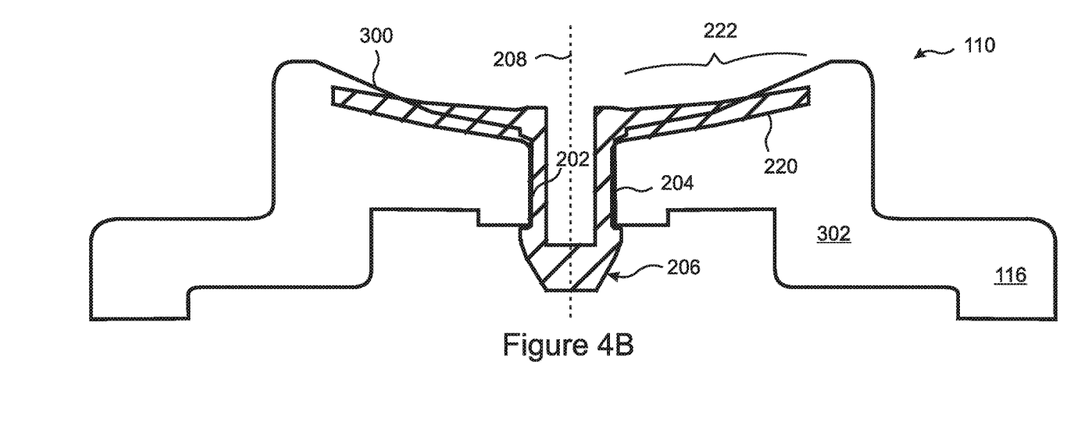
FIG. 4B is an overlay drawn to scale of a cross sectional view of the valve seat of FIG. 4A and the valve of FIG. 4A shown in a relaxed configuration.

FIG. 4B is a cross sectional overlay of the valve seat 300 and valve 206, showing the overlap of the valve flexible extension 222 with the sealing surface 300 of the seat 302 when the valve flexible extension 222 is not vertically displaced by the seat 300. It can be seen that the overlap is greater in the outer region 306, thereby increasing the elastic tension in that region as compared to prior art designs such as the one shown in FIG. 2A.

Figure 4C:
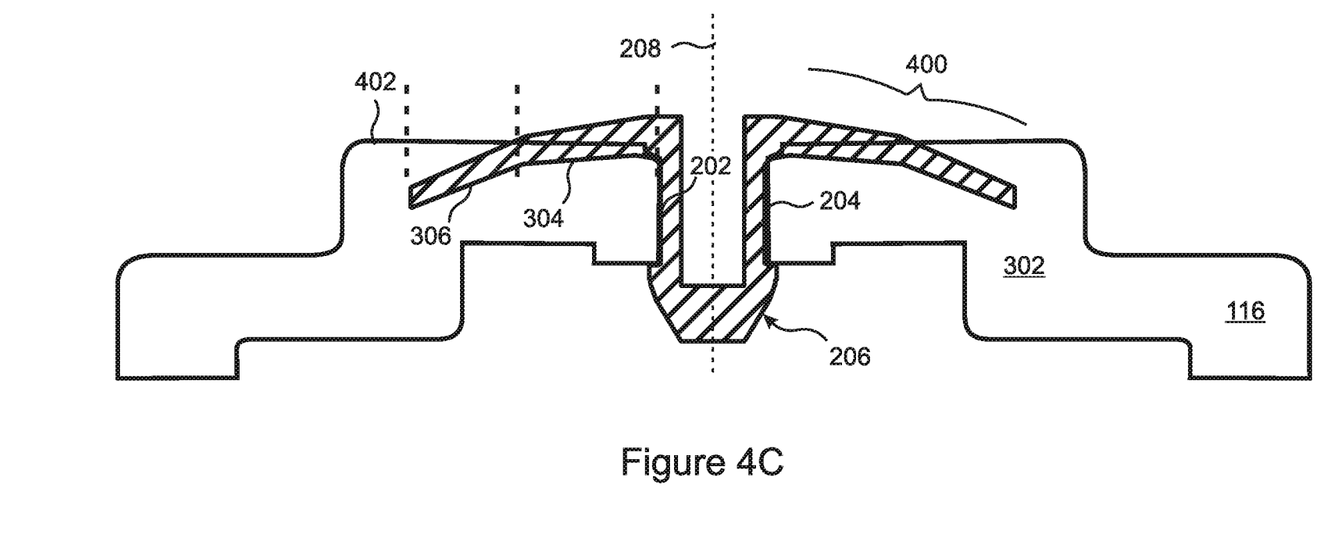
FIG. 4C is an overlay drawn to scale of a cross sectional view of a valve seat and a cross sectional view of a valve in a relaxed configuration according to another embodiment of the present invention.

With reference to FIG. 4C, in other embodiments a similar result is realized by shaping the flexible extension 400 of the valve 206 so that its outer region is deflected downward more steeply or upward less steeply than its inner region. In the embodiment of FIG. 4C, the seat 302 includes a single, substantially horizontal sealing surface 402, while the valve 206, when not vertically displaced by the seat 302, is sloped downward with two different liner slopes, one in the inner region 304 and another in the outer region 306. Note that in general, it is the differences between the shapes of the valve and seat, not the valve and seat shapes considered separately, that control the distribution of elastic tension over the valve sealing surface 220.

Figure 5:
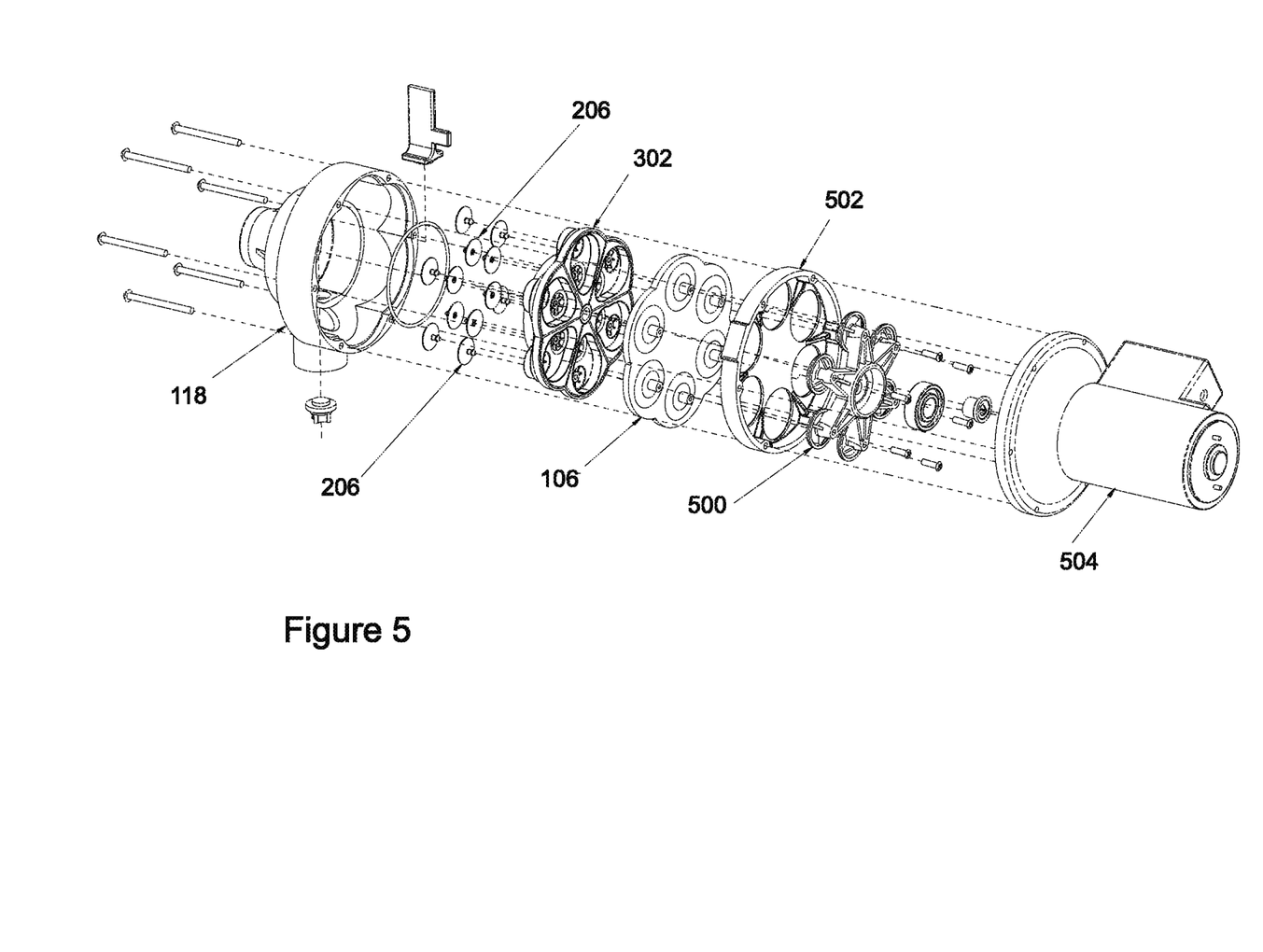
FIG. 5 is an exploded, perspective assembly view drawn to scale of a diaphragm pump in an embodiment of the present invention where the pump includes six inlet valve assemblies and six outlet valve assemblies, all of which being configured as illustrated in FIG. 4A.

In some embodiments, the diaphragm pump is a multi-chamber pump. FIG. 5 is a perspective, exploded assembly view, drawn to scale, of a 6-chambered embodiment that includes the valve assemblies 110 of FIGS. 3, 4A, and 4B. Each of the pump chambers includes one inlet valve assembly and one outlet valve assembly. In addition to the elements shown in FIGS. 3, 4A, and 4B, FIG. 5 also illustrates a wobble plate 500, supported by a support ring 502 and driven by a motor 502, that depresses and releases sections of the diaphragm 106 alternately over each of the chambers.

Figure 6:
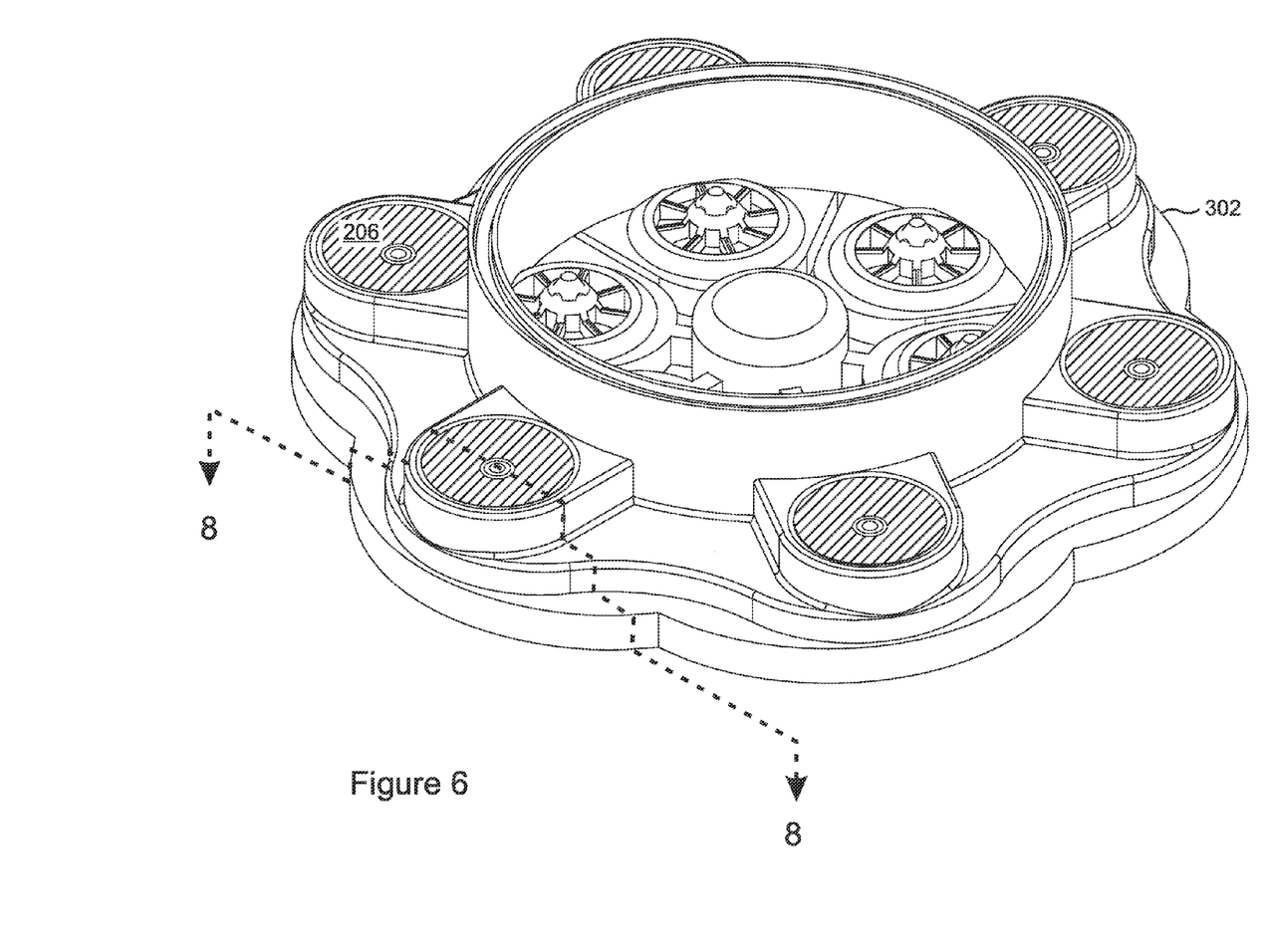
FIG. 6 is a perspective view drawn to scale of the assembled valve plate and valves of FIG. 5.

FIG. 6 is a perspective view, drawn to scale, of the valve plate 206 of FIG. 5 showing the 12 valves 208 that are installed. In this embodiment, the six outer valve assemblies are the outlet valves, and the six inner valve assemblies are the inlet valves.

Figure 7:
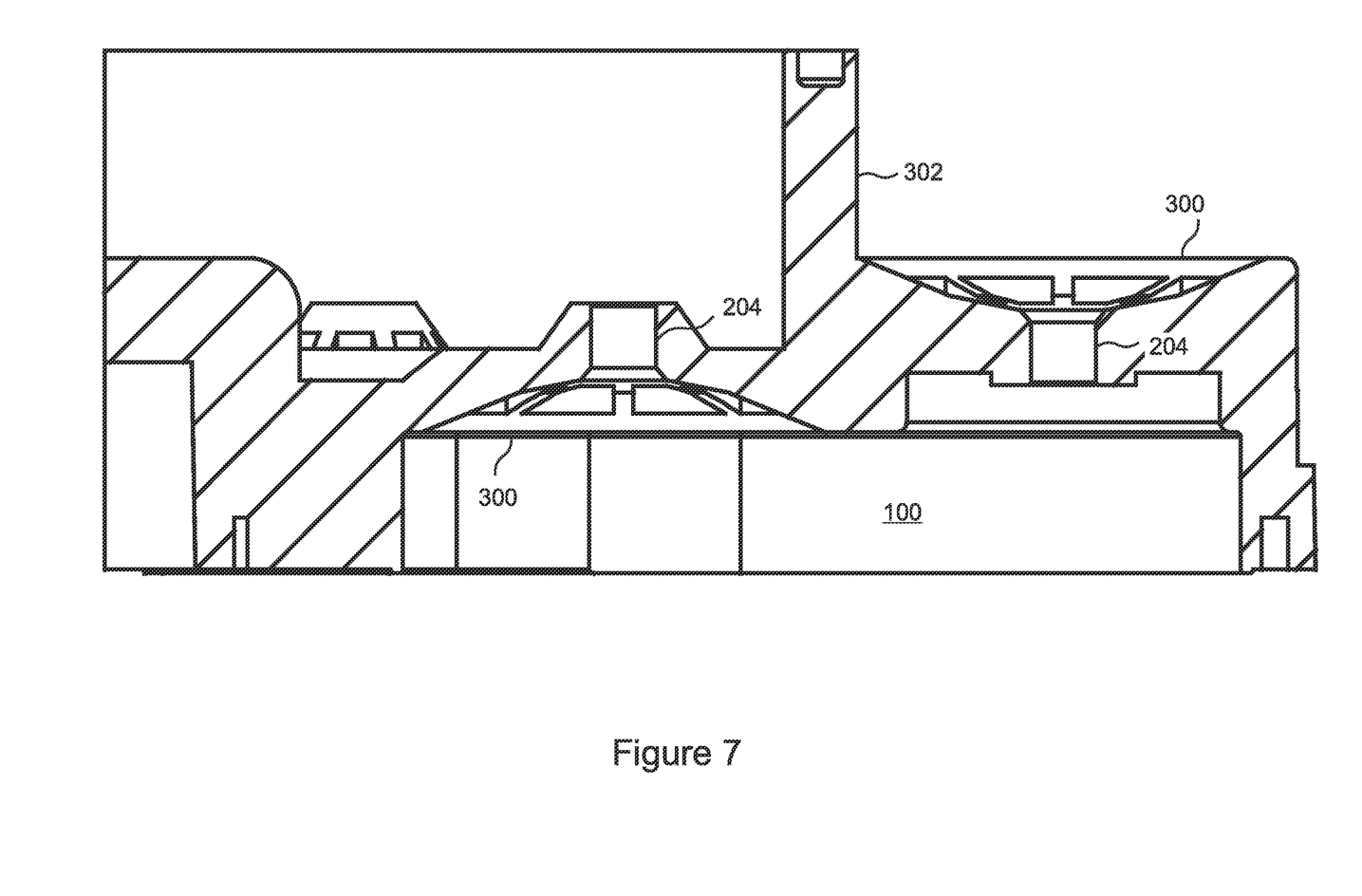
FIG. 7 is a sectional view of FIG. 6 drawn to scale, where the section is taken from the center of the valve seat outward through one inlet valve assembly and one outlet valve assembly.

FIG. 7 is a sectional view drawn to scale of half of the valve plate of FIG. 6, shown with the valves removed. The section is taken from the center of the valve plate 206 outward through the centers of one inlet valve assembly and one outlet valve assembly.

Figure 8A:
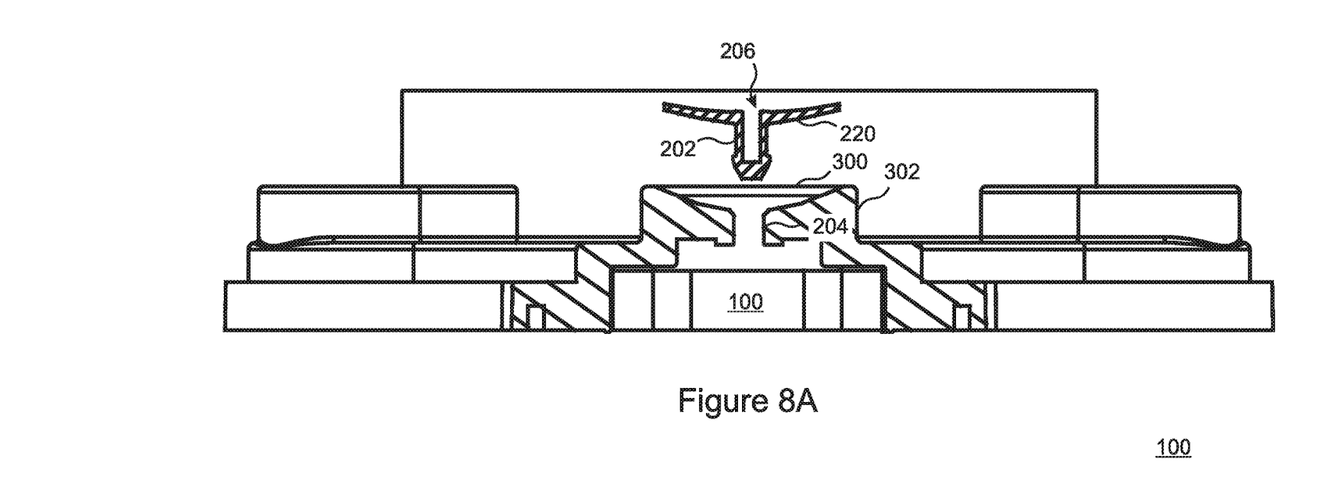
FIG. 8A is a sectional view drawn to scale of one of the valve assemblies of FIG. 6, where the section is taken along the dashed line indicated in FIG. 6, shown with the valve removed and positioned above the valve seat.
Figure 8B:
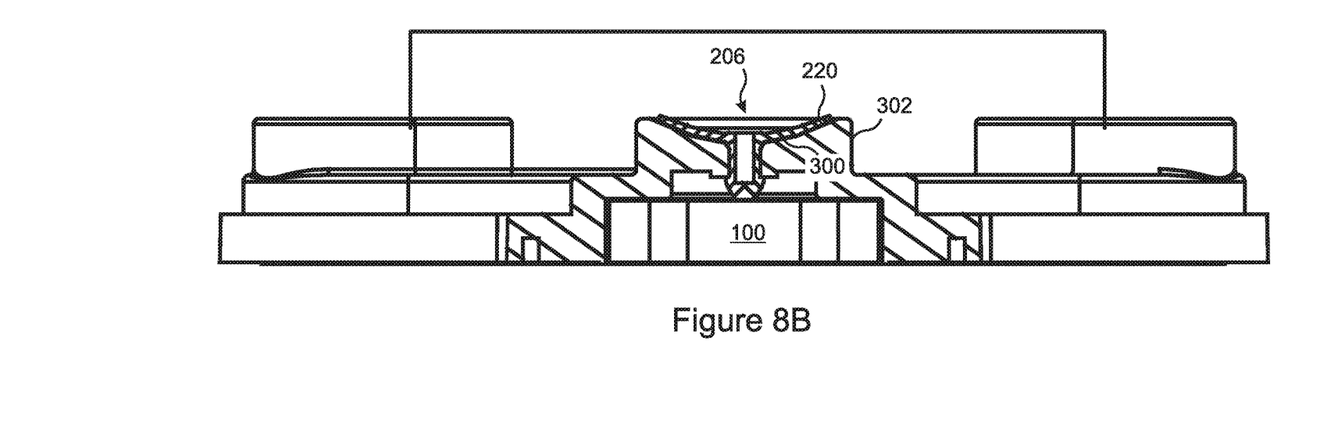
FIG. 8B is a sectional view similar to FIG. 8A, drawn to scale, with the valve shown installed in the valve seat.

FIGS. 8A and 8B are sectional views drawn to scale of the valve plate of FIG. 6, where the section is taken along the dashed line indicated in FIG. 6. In FIG. 8A, the valve 206 is not installed in the seat 302, and is shown positioned above the seat 302. In FIG. 8B, the valve 206 is shown installed in the seat 302.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A one-way valve assembly, comprising:
   a valve seat having a first sealing surface, said first sealing surface having a first surface shape; and
   a valve having a flexible extension, said flexible extension including a second sealing surface, said second sealing surface having a second surface shape when the valve is not attached to the valve seat and the flexible extension is in a relaxed state;
   a difference between said first surface shape and said second surface shape causing vertical elastic displacement of said flexible extension when said valve is attached to said valve seat, said vertical elastic displacement pressing the second sealing surface against the first sealing surface so as to cause the second sealing surface to be in direct contact with the first sealing surface over a range of contact between the first and second sealing surfaces, and to form a fluid seal therebetween;
   said vertical elastic displacement in said range of contact being describable as a function $D(r)$, where r is a radial distance from a center of the valve seat, $D(r)$ having a non-zero slope that is flat in an outer range of r and in an inner range of r, said slope being greater in the outer range of r than in the inner range of r.

2. The valve assembly of claim 1, wherein said valve comprises an attachment feature that includes a valve stem having a retention barb that is configured to retain the valve stem in a shank of the valve seat, said valve stem being shorter than said shank, thereby causing said second sealing surface to be pressed against said first sealing surface when the valve is installed in the valve seat.

3. The valve assembly of claim 1, wherein both the first and second surface shapes curve upward as a function of increasing radial distance r from the center of the valve seat, the second surface shape curving upward more rapidly than the first surface shape.

4. The valve assembly of claim 1, wherein the first surface shape includes a flat annular outer region concentric about a flat annular inner region, a slope of the first surface shape being at least 10 degrees greater in the outer annular region that in the inner annular region.

5. The valve assembly of claim 1, wherein at least one of the first surface shape and the second surface shape is a section of a first right circular conical surface bounded by two horizontal planes.

6. A diaphragm pump for pumping a process fluid, the diaphragm pump comprising:
   a pump housing;
   an inlet region within the pump housing into which process fluid flows in an inlet direction;
   an outlet region within the pump housing from which process fluid flows out in an outlet direction;
   a pumping zone that is separated from the inlet region by at least one inlet valve assembly, and from the outlet region by at least one outlet valve assembly, the pumping zone being partially bounded by a flexible diaphragm;
   at least one of said inlet valve assembly and said outlet valve assembly including:
      a valve seat having a first sealing surface, said first sealing surface having a first surface shape; and
      a valve having a flexible extension, said flexible extension including a second sealing surface, said second sealing surface having a second surface shape when the valve is not attached to the valve seat and the flexible extension is in a relaxed state;
      a difference between said first surface shape and said second surface shape causing vertical elastic displacement of said flexible extension when said valve is attached to said valve seat, said vertical elastic displacement pressing the second sealing surface against the first sealing surface so as to cause the second sealing surface to be in direct contact with the first sealing surface over a range of contact between the first and second sealing surfaces, and to form a fluid seal therebetween;
      said vertical elastic displacement in said range of contact being describable as a function $D(r)$, where r is a radial distance from a center of the valve seat, $D(r)$ having a non-zero slope that is flat in an outer range of r and in an inner range of r, said slope being greater in the outer range of r than in the inner range of r.

7. The diaphragm pump of claim 6, wherein said valve comprises an attachment feature that includes a valve stem having a retention barb that is configured to retain the valve stem in a shank of the valve seat, said valve stem being shorter than said shank, thereby causing said second sealing surface to be pressed against said first sealing surface when the valve is installed in the valve seat.

8. The diaphragm pump of claim 6, wherein both the first and second surface shapes curve upward as a function of increasing radial distance r from the center of the valve seat, the second surface shape curving upward more rapidly than the first surface shape.

9. The diaphragm pump of claim 6, wherein the first surface shape includes a flat annular outer region concentric about a flat annular inner region, a slope of the first surface shape being at least 10 degrees greater in the outer annular region that in the inner annular region.

10. The diaphragm pump of claim 6, wherein at least one of the first surface shape and the second surface shape is a section of a first right circular conical surface bounded by two horizontal planes.

* * * * *